Patented Aug. 31, 1926.

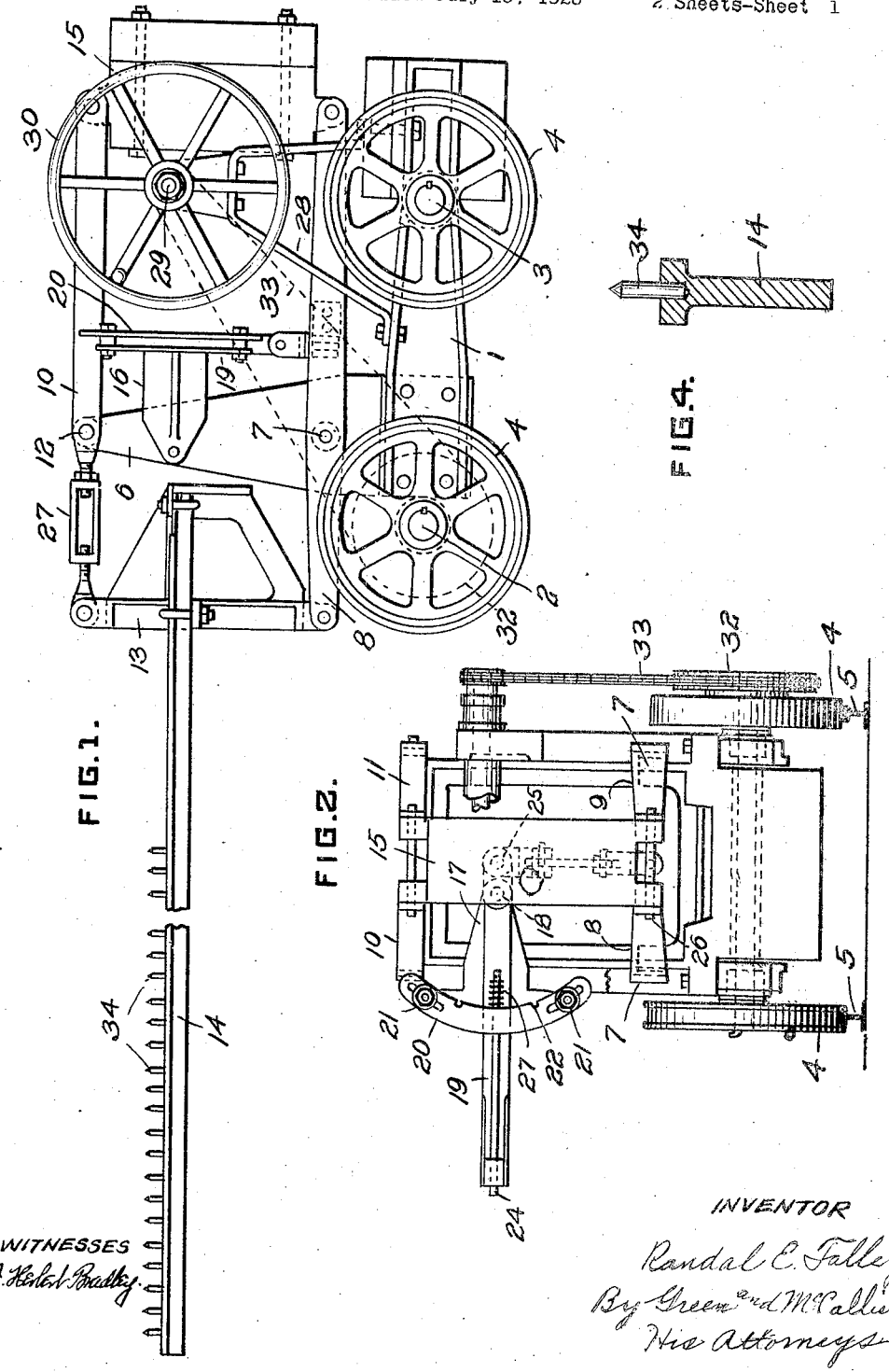

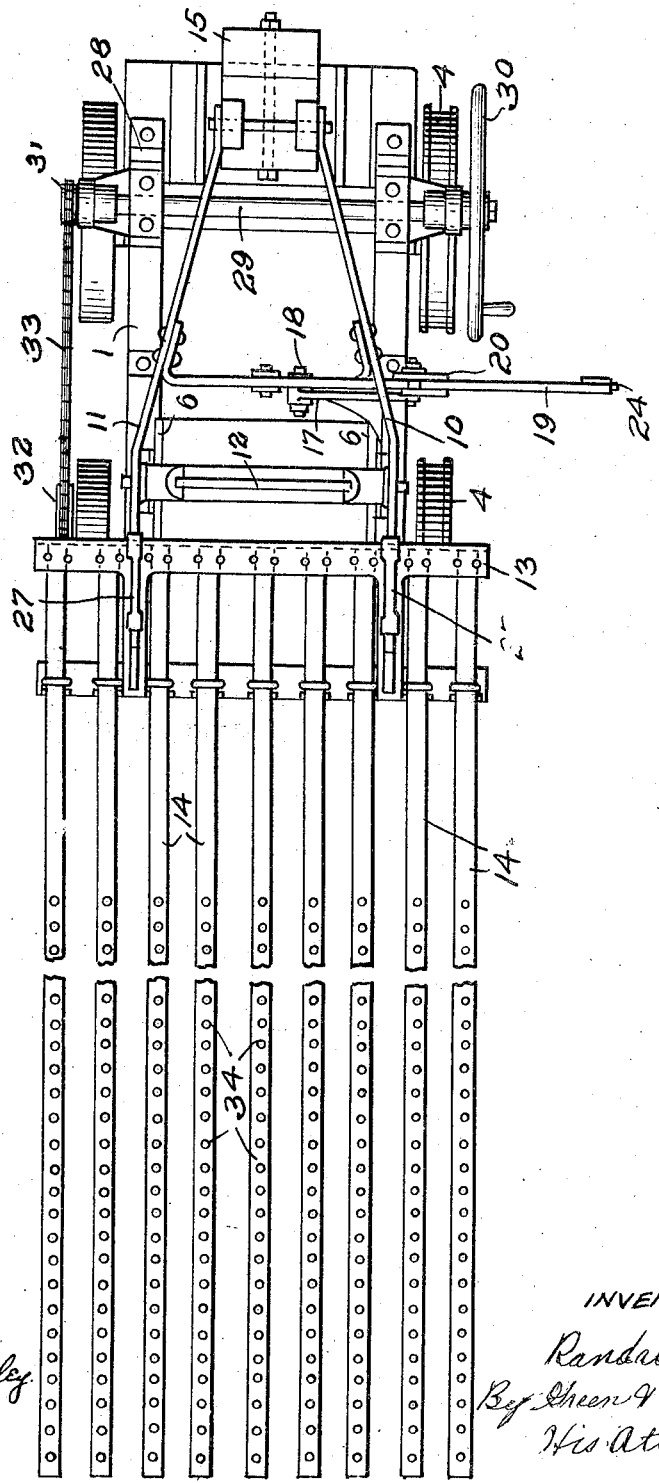

1,597,737

UNITED STATES PATENT OFFICE.

RANDAL E. TALLEY, OF IRWIN, PENNSYLVANIA, ASSIGNOR TO GEORGE J. HAGAN COMPANY, A CORPORATION OF PENNSYLVANIA.

CHARGING FORK.

Application filed July 19, 1923. Serial No. 652,470.

My invention relates to charging forks for charging furnaces such for example, as electric enameling furnaces used in the manufacture of kitchen ware and the like, and an object is to provide a simple, manually operated fork for this purpose.

A charging fork of this type weighs at least 3,000 pounds and a further object is to provide such a fork with a manually operated work or ware support mounted upon a traveling carriage which is adapted to be manually driven and controlled, and which will enable the operator to run a load into the furnace, deposit it therein and withdraw the charging fork in a minimum of time and without undue exertion.

A still further object is to so construct a charging fork of this type that the work or ware will be supported in spaced relation to the work supporting tines, preventing any marring of the work surface by direct contact with the tines.

One embodiment of my invention is shown in the accompanying drawings, in which, Figure 1 is a side elevation of a charging fork constructed in accordance with my invention. Fig. 2 is an end elevation of the fork shown in Fig. 1. Fig. 3 is a top plan view and Fig. 4 is a vertical section on an enlarged scale through one of the work supporting tines showing one of the removable pins for directly supporting the work.

My invention comprises a frame 1 directly supported upon axles 2 and 3, on which are mounted the supporting wheels 4 which, if desired may be adapted to run upon guide tracks 5. Rigidly secured to the lower frame 1 is a vertically extending support including upright members 6. Pivotally mounted between their ends on pivots 7 on the lower portion of the upright supports 6 are horizontally extending levers 8 and 9. These levers extend forwardly of the support 6 in parallel. As shown in Fig. 2 the levers 8 and 9 extend rearwardly of the supports 6 in the same horizontal plane but are bent inwardly toward each other.

At the top of the upright supports 6 are similarly shaped levers 10 and 11 mounted upon a pivot shaft 12 extending between the two upright supports.

Pivotally supported between the forward ends of these levers is a bracket 13 to which are secured the horizontally extending tines 14 which form the work or ware support of the fork. At the opposite ends of the levers from the work support is provided a counterbalance 15 pivotally secured to the rear ends of the levers.

Extending rearwardly from one of the upright supports 6 is a bracket 16 having an inwardly extending arm 17 on which is pivotally mounted, as at 18, a hand lever 19. A locking segment 20 is adjustably secured to the lever supporting bracket 16 by means of a slot and bolt connection 21. This locking segment has notches 22 which are adapted to cooperate with a spring-pressed pawl 23 on the hand lever 19. The pawl 23 is formed on a rod 24 which extends outwardly along the lever by means of which it is adapted to be disengaged from the notches 22. The hand lever 19 is pivotally connected at its inner end 25 to the lower levers 8 and 9 by a double eye bolt secured to the lower levers through the medium of a pivot rod 26.

In each of the upper levers 10 and 11, between the pivot mounting 12 and the upper part of the bracket 13 are provided turnbuckles 27 which provide a means for adjusting the relative lengths of the upper and lower sets of parallel levers, thus enabling the work support 14 to be always supported in a horizontal position.

A bracket 28 is rigidly secured to the lower frame 1 to the rear of the upright support 6. Mounted upon this bracket and extending transversely of the fork is a shaft 29 provided at one end with a hand wheel 30 and at the other end with a small sprocket 31. One of the carriage axles is provided with a relatively large sprocket 32. A driving chain 33 runs over the two sprockets and provides for manually driving the supporting carriage, the sprocket ratio being such that the carriage can be easily driven and controlled by the operator without undue exertion. This hand wheel provides a means for easily starting the heavy fork when it is desired to charge the ware into the furnace and it also serves as a means for readily stopping the fork at the exact point desired in its travel. This is essential in view of the weight of the device.

The work supporting tines 14 are provided with removable pins 34 which support the work in spaced relation to the tines. This prevents marring or scratching of the work surface which ordinarily occurs when the work is supported directly upon the tines themselves.

It should be understood that the rack which supports the ware in the furnace is practically a counterpart of the charging fork tines, being made up of spaced, parallel, longitudinal bars which correspond in spacing to that of the fork tines and which have similar removable pins.

By supporting the work support between parallel levers I am enabled to raise and lower such support while maintaining it horizontal and by counterbalancing these levers they may be manually operated to raise or lower the work support.

In charging a furnace the work or ware is first placed upon the horizontally extending tines which are then raised by manipulating the hand lever 19 after releasing the pawl 23 from engagement with the locking segment. The work support may be maintained at its desired elevation by engagement of the pawl with one of the notches 22. The fork is then moved toward the furnace by rotation of the hand wheel which transmits driving motion to the carriage through the sprocket and chain connection. When the tines have entered the furnace they are lowered by manipulation of the hand lever 19 and the charging fork is then withdrawn after depositing the load on the supporting rack within the furnace. It is obvious that in removing articles from the furnace the same operations will be performed in the reverse order.

Having thus described my invention I claim:—

1. A charging fork having a horizontal work support, a lever for raising and lowering said work support, a pawl on said lever and an adjustable locking segment cooperating with said pawl for locking said work support at different elevations.

2. A charging fork having a horizontal work support, a lever for raising and lowering said work support, an adjustable locking segment for said lever for locking said work support at different elevations and means for maintaining said work support horizontal.

3. A charging fork having a horizontal work support, counterbalanced parallel supporting levers adapted to maintain said work support horizontal and a hand lever connected to said supporting levers for oscillating the same so as to raise or lower said work support.

4. A charging fork having a horizontal work support, counterbalanced parallel levers secured to said work support, means for varying the relative length of said levers and means for oscillating said levers so as to raise or lower said work support.

5. A charging fork having a horizontal work support, counterbalanced parallel levers secured thereto so as to maintain said work support horizontal, means for varying the relative lengths of said levers, a hand lever connected to said supporting levers for oscillating the same so as to raise or lower said work support and an adjustable locking segment cooperating with said hand lever for locking said work support at different elevations.

6. A charging fork having horizontally extending tines, parallel counterbalanced supporting levers therefor adapted to elevate and depress said tines while maintaining them horizontal, a hand lever for oscillating said supporting levers and an adjustable locking means cooperating with said hand lever for locking said tines at different elevations.

7. A charging fork having horizontally extending work supporting tines and removable pins mounted thereon for supporting work in spaced relation to said tines.

8. A charging fork having a plurality of perforated tines and removable pins adapted to be received within said perforations for supporting work in spaced relation to said tines.

9. A charging fork having counterbalanced parallel levers pivotally mounted thereon between their ends, a work support mounted between adjacent ends of said levers, a counterbalance secured to the opposite ends of said levers, a hand lever mounted upon said charging fork and connected to one of said parallel levers so that operation of said hand lever oscillates said parallel levers to raise and lower said work support and means for locking said hand lever in different positions.

In testimony whereof, I have hereunto subscribed my name this 16th day of July, 1923.

RANDAL E. TALLEY.